United States Patent [19]

Wittmann et al.

[11] Patent Number: 4,804,708
[45] Date of Patent: Feb. 14, 1989

[54] THERMOPLASTIC MOLDING COMPOUNDS BASED ON SPECIAL GRAFT POLYMERS

[75] Inventors: Dieter Wittmann, Krefeld; Christian Lindner, Cologne, both of Fed. Rep. of Germany; Hans-Jürgen Kress, Pittsburgh, Pa.; Horst Peters, Leverkusen; Jochen Schoeps, Krefeld, both of Fed. Rep. of Germany

[73] Assignee: Bayer Aktiengesellschaft, Leverkusen-Bayerwerk, Fed. Rep. of Germany

[21] Appl. No.: 125,886

[22] Filed: Nov. 27, 1987

[30] Foreign Application Priority Data

Dec. 9, 1986 [DE] Fed. Rep. of Germany ....... 3641990

[51] Int. Cl.⁴ ............................................. C08L 69/00
[52] U.S. Cl. ....................................... 525/67; 525/64; 525/73; 525/74

[58] Field of Search ................... 525/67, 64, 146, 148, 525/73, 74, 902

[56] References Cited

U.S. PATENT DOCUMENTS 4,535,124  8/1985  Binsack et al. ......................... 525/67
4,631,311  12/1986  Wingler et al. ....................... 525/67

Primary Examiner—Theodore E. Pertilla
Attorney, Agent, or Firm—Connolly and Hutz

[57] ABSTRACT

The present invention relates to thermoplastic molding compounds based on thermoplastic polycarbonates, graft polymers and optionally thermoplastic copolymers, characterized in that the graft polymers contain at least one primary or secondary aliphatic acrylic acid ester or tert.-butyl acrylate or tert.-butyl methylacrylate incorporated by polymerization. The invention also relates to a process for the preparation of these thermoplastic molding compounds.

12 Claims, No Drawings

THERMOPLASTIC MOLDING COMPOUNDS BASED ON SPECIAL GRAFT POLYMERS

The present invention relates to thermoplastic moulding compounds containing

A. from 5 to 98 parts by weight, preferably from 20 to 95 parts by eight, of one or more thermoplastic polycarbonates.
B. from 2 to 70 parts by weight, preferably from 5 to 60 parts by weight, of one or more graft polymers of
B.1 from 10 to 95 parts by weight, preferably from 20 to 70 parts by weight, of a cross-linked, particulate elastomeric graft stock having an average particle diameter ($d_{50}$-value) of from 0.05 to 5 μm, preferably from 0.075 to 1 μm, and a glass transition temperature $\leq 10°$ C., preferably $\leq -20°$ C., and
B.2 from 90 to 5 parts by weight, preferably from 80 to 30 parts by weight, of a graft scion of vinyl monomer polymer obtained by the graft polymerisation of a monomer mixture of
B.2.1 from 50 to 95 parts by weight of styrene, α-methylstyrene, nuclear-substituted styrene, methylmethacrylate or mixtures thereof, and
B.2.2 from 50 to 5 parts by weight of (meth)acrylonitrile, methylmethacrylate, maleic acid anhydride, N-substituted maleimide or mixtures thereof and, based on 100 parts by weight of the sum of B.2.1 and B.2.2,
B.2.3 from 0 to 40 parts by weight, preferably from 2 to 30 parts by weight, most preferably from 3 to 20 parts by weight of a primary or secondary aliphatic acrylic acid ester having from 2 to 10 carbon atoms in the alcohol moiety of the molecule, and
B.2.4 from 0 to 10 parts by weight, preferably from 0.2 to 8 parts by weight, most preferably from 0.3 to 4 parts by weight, of a tert.-butyl ester of acrylic acid or methacrylic acid, in the presence of the graft stock B.1, and optionally
C. from 0 to 80 parts by weight, preferably from 0 to 70 parts by weight and in particular from 5 to 50 parts by weight, of a thermoplastic copolymer of
C.1 from 50 to 95 parts by weight of styrene, α-methylstyrene, nuclear-substituted styrene, methyl methacrylate or mixtures thereof, and
C.2 from 50 to 5 parts by weight of (meth)acrylonitrile, methyl methacrylate, maleic acid anhydride, N-substituted maleimide or mixtures thereof,
the sum of the parts by weight of A and B plus optionally C always amounting to 100 parts by weight,
and optionally, effective quantities of stabilizers, pigments, plasticizers, mould release agents, flame retardants and/or antistatic agents, characterised in that at least one of the components, B.2.3 or B.2.4, is contained in B.2.

The improvement in coalescence seam strength of mixtures of thermoplastic, aromatic polycarbonates, graft polymers and optionally copolymers has already been described (see, for example, DE-OS No. 2 259 565, DE-OS No. 2 329 548, EP-OS No. 000 5202, EP-OS No. 00 74 112 (Sumitomo Naugatuck Co.) and DE-OS No. 3 336 369 (Sumitomo Naugatuck Co.).

The methods described always require the observance of special conditions for improving the coalescence seam strength. DE-OS No. 2 329 546 discloses three-component mixtures of polycarbonates, butadiene polymers and copolymers which also have exceptionally strong coalescence seams (page 3, last paragraph of DE-OS).

It has now surprisingly been found that moulding compounds which have a particularly advantageous combination of coalescence seam strength and low temperature strength are obtained if they are prepared from graft polymers in which the graft scion contains not only the graft monomers known in the art but in addition certain primary or secondary alkyl acrylates and/or tert.-butyl (meth)acrylates.

Thermoplastic, aromatic polycarbonates suitable for use as component A according to the invention are based on diphenols corresponding to the following formula (II)

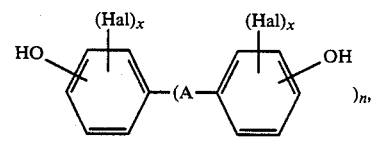

wherein A denotes a single bond, a $C_1$–$C_5$-alkylene, $C_2$–$C_5$-alkylidene, $C_5$–$C_6$-cycloalkylidene, S or $SO_2$, Hal denotes chloride or bromine, x has the value 0, 1 or 2 and "n" has the value 1 or 0, and optionally the following formula (IIa)

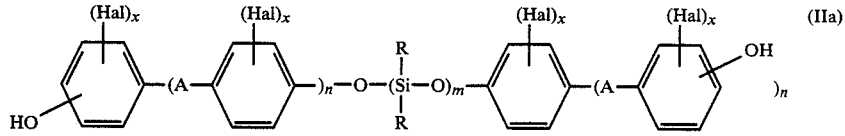

wherein A, Hal, x and "n" have the meanings indicated for formula (II) and the R's, which may be identical or different, denote a straight chained $C_1$–$C_{20}$-alkyl group, a branched $C_3$–$C_{20}$-alkyl group or a $C_6$–$C_{20}$-aryl group, preferably $CH_3$, and "m" represents an integer with a value from 5 to 100, preferably from 20 to 80.

Polycarbonates suitable for use as component A according to the invention include both homopolycarbonates and copolycarbonates but the diphenols of formula (IIa) are used only for the preparation of copolycarbonates with diphenols of formula (II), and the proportion by weight of diphenols of formula (IIa) in the copolycarbonates is from 1 to 20% by weight, preferably from 1.5 to 15% by weight and in particular from 2 to 10% by weight, based in each case on the total weight of diphenols of formulae (II) and (IIa).

Component A. may also consist of mixtures of the thermoplastic polycarbonates defined above, and when they are mixtures with polydiorganosiloxane/polycarbonate block polycarbonates, then the proportion by weight of diphenols (IIa), based on the total sum of diphenols in the polycarbonate mixture, is again from 1 to 20% by weight.

The preparation of polycarbonates suitable for use as component A. according to the invention is known in the literature and may be carried out, for example, with phosgene by the phase interface process or with phosgene by a homogeneous phase process, the so-called pyridine process, the required molecular weight being obtained in known manner by using a suitable quantity of known chain breaking agents. (Concerning polycarbonates containing polydiorganosiloxanes, see, for example, DE-OS No. 3 334 872 (Le A 22 594)).

Examples of suitable chain breaking agents include phenol, p-chlorophenol, p-tert.-butylphenol and 2,4,6-tribromophenol as well as long chained alkyl phenols such as 4-(1,3-tetramethylbutyl)-phenol according to DE-OS No. 2 842 005 (Le A 19 006) and monoalkyl and dialkylphenols having a total of 8 to 20 carbon atoms in the alkyl substituents according to DE-OS No. 3 506 472 (Le A 23 654) such as 3,5-di-tert.-butylphenol, p-iso-octylphenol, p-tert.-octylphenol, p-dodecylphenol, 2-(3,5-dimethylheptyl) phenol and 4-(3,5-dimethyl-heptyl)-phenol. The quantity of chain breaking agent to be used is generally from 0.5 mol-% to 10 mol-%, based on the sum of diphenols (II) and optionally (IIa) put into the process.

Polycarbonates suitable for use as component A. according to the invention have weight average molecular weights (Mw, determined, for example, by ultracentrifugation or scattered light measurement) of from 10.000 to 200,000, preferably from 20,000 to 80,000.

Examples of suitable diphenols corresponding to formula (II) include hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of formula (II) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Suitable diphenols of formula (IIa) include those in which R stands for methyl, ethyl, propyl, n-butyl, tert.-butyl or phenyl.

Preferred diphenols of formula (IIa) are those corresponding to the following formula (IIb):

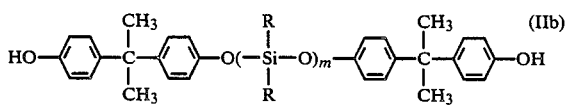

wherein the R's are identical and have the meanings indicated above, i.e. methyl, etc. or phenyl and m again stands for an integer of from 5 to 100. preferably from 20 to 80.

The diphenols of formula (IIa) may be prepared, for example, from the corresponding bis-chloro compounds (III):

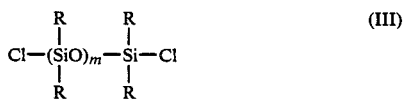

and the diphenols (II), for example according to U.S. Pat. No. 3 419 634, column 3, in combination with U.S. Pat. No. 3 189 662.

R and m have the same meaning in the bis-chloro compounds (III) as in the diphenols (IIa) and (IIb).

The polycarbonates suitable for use as component A. according to the invention may be branched in known manner, preferably by the incorporation of from 0.05 to 2.0 mol-%, based on the sum of diphenols, of trifunctional or higher than trifunctional compounds, for example, those having 3 or more than 3 phenolic groups.

Preferred polycarbonates, apart from the bisphenol A homopolycarbonate, are copolycarbonates of bisphenol A with up to 15 mol-%, based on the molar sums of diphenols, of 2,2-bis-(3,5-dibromo-4-hydroxyphenyl)-propane as well as the copolycarbonates of diphenols of formula (II) with 1 to 20% by weight of diphenols of formula (IIa), preferably of formula (IIb), based in each case on the total weight of diphenols (II) and (IIa) or (II) and (IIb).

Suitable rubbers for the preparation of the graft polymers used as component B. include in particular polybutadiene, butadiene/styrene copolymers containing up to 30% by weight, based on the weight of the rubber, of a lower alkyl ester of acrylic or methacrylic acid, such as, for example, methyl methacrylate, ethyl acrylate, methyl acrylate or ethyl methacrylate. Polyisoprene and polychloroprene are also suitable rubbers. Further examples of suitable rubbers include alkyl acrylate rubbers based on $C_1$-$C_8$-alkyl acrylates, in particular ethyl, butyl and ethylhexyl acrylate. These alkyl acrylate rubbers may contain up to 30% by weight, based on the weight of the rubber, of monomers such as vinyl acetate, acrylonitrile, styrene, methylmethacrylate and/or vinyl ether incorporated by copolymerisation. These alkyl acrylate rubbers may also contain minor quantities, preferably up to 5% by weight, based on the weight of the rubber, of ethylenically unsaturated monomers which have a crosslinking action. Cross-linking agents of this kind include, for example, alkylenediol di-(meth)acrylates, polyester di-(meth)acrylates, divinylbenzene, trivinylbenzene, triallylcyanurate, allyl-(meth)acrylate, butadiene and isoprene. Alkyl acrylates of this type are known. Acrylate rubbers used as graft stock may also be products containing a cross-linking diene rubber of one or more conjugated dienes such as polybutadiene or a copolymer of a conjugated diene with an ethylenically unsaturated monomer such as styrene and/or acrylonitrile as core. Other suitable rubbers include, for example, EPDM rubbers, i.e. rubbers of ethylene, propylene and an unconjugated diene monomer.

Diene rubbers and alkyl acrylate rubbers are preferred rubbers for the preparation of the graft polymers B.

Acrylate rubbers are particularly advantageous if they have a core-shell structure, i.e. a core of a different polymer covered by a shell of cross-linked alkyl acrylate rubber. Rubbers of this type are known.

The rubbers are present in graft polymer B. at least partly as cross-linked particles having an average particle size of from 0.05 to 5 μm, in particular from 0.075 to 1 μm, and they preferably have gel contents of at least 70% by weight.

The graft polymers B. are prepared by radical graft polymerisation of the above mentioned monomer mixtures of B.2.1 and B.2.2 and B.2.3 and/or B.2.4 in the presence of the rubbers B.1 which are to be grafted.

Preferred methods of preparation of the graft polymers B. are emulsion, solution, solvent-free and suspension polymerisation.

The graft scion B.2 of the graft product B may be prepared, for example, by polymerisation of the corresponding monomers in the presence of a latex (emulsion) of graft stock B.1. Polymerisation may be initiated by radical initiators, e.g. with persulphates, peroxides, percarbonates or peresters, but in particular with water-soluble initiators such as persulphates or redox initiator systems. These polymerisation processes are known.

Graft scions B.2 according to the invention are obtained by using graft monomers as defined under B.2.3 and/or B.2.4 for the graft polymerisation in addition to the prior art graft monomers B.2.1 and B.2.2.

Although the presence of graft comonomers according to B.2.3 alone or according to B.2.4 alone in the scion of the graft polymer B is sufficient to result in improved moulding compounds, certain mixtures of B.2.3 and B.2.4 are particularly effective for improving the low temperature strength and coalescence seam strength of the moulding compounds.

Preferred graft scions B.2 are therefore obtained by the graft polymerisation of a monomer mixture of 50 to 95 parts by weight of B.2.1 consisting of styrene, α-methylstyrene, nuclear-substituted styrene, methyl methacrylate or mixtures thereof and from 50 to 5 parts by weight of B.2.2 consisting of (meth)acrylonitrile, methyl methacrylate, maleic acid anhydride, N-substituted maleimide or mixtures thereof, and, based on 100 parts by weight of the sum of B.2.1 and B.2.2, from 2 to 30 parts by weight, most preferably from 3 to 20 parts by weight of B.2.3 consisting of a primary or secondary aliphatic acrylic acid ester (containing from 2 to 10 carbon atoms in the alcohol moiety of the molecule), in particular ethyl acrylate, propyl acrylate, butyl acrylate, hexyl acrylate and ethyl hexyl acrylate, and from 0.2 to 8 parts by weight, most preferably from 0.3 to 4 parts by weight of B.2.4 consisting of a tert.-butyl ester of (meth)acrylic acid, in particular t-butyl acrylate.

Preferred copolymers used as component C are those composed of at least one monomer selected from styrene, α-methylstyrene and nuclear-substituted styrene according to C.1 and at least one monomer selected from acrylonitrile, methacrylonitrile, methyl methacrylate, maleic acid anhydride and N-substituted maleimide according to C.2.

Thermoplastic copolymers having a composition according to component B.2 are frequently obtained as by-products of the graft polymerisation carried out for the preparation of component B., especially when large quantities of monomers are grafted on small quantities of rubber.

The quantity of copolymer C. to be used according to the invention, amounting to from 0 to 80 parts by weight, preferably from 0 to 70 parts by weight, in particular to 5 to 50 parts by weight, based on 100 parts by weight of A.+B.+C., does not include this by-product of graft polymerisation.

The copolymers defined as component C. are resinous, thermoplastic and free from rubber. Particularly preferred copolymers C. are those obtained from styrene and/or α-methylstyrene with acrylonitrile and optionally methyl methacrylate.

Halogenated styrenes and p-methylstyrene are examples of nuclear-substituted styrenes according to B.2.1 and C.1.

Particularly preferred ratios by weight in the thermoplastic copolymer C. are from 60 to 80% by weight of C.1 and 40 to 20% by weight of C.2.

The copolymers defined as component C. are known and may be prepared by radical polymerisation, in particular by emulsion, suspension, solution or solvent-free polymerisation. The copolymers according to component C. preferably have molecular weights $\overline{M}w$ (weight average, determined by light scattering or sedimentation) of from 15,000 to 200,000 and limiting viscosity numbers of from 20 to 110 ml/g (determined in dimethylformamide at 25° C.).

The moulding compounds according to the invention may also contain the usual quantities of conventional additives used for polycarbonates, graft polymers or thermoplastic copolymers, such as stabilizers, pigments, plasticizers, mould release agents, flame retardants and antistatic agents.

The moulding compounds according to the invention containing components A. B. and optionally C. and optionally effective quantities of conventional stabilizers, pigments, plasticizers, mould release agents, flame retardants and/or antistatic agents are prepared by mixing the components in known manner and melt compounding or melt extruding them at temperatures of from 200° C. to 330° C. in conventional apparatus such as internal kneaders, extruders or double shaft screws.

The present invention thus also relates to a process for the preparation of thermoplastic moulding compounds containing components A.,B. and optionally C. and optionally effective quantities of conventional stabilizers, pigments, plasticizers, mould release agents, flame retardants and/or antistatic agents, characterised in that components A. B. and optionally C. and optionally effective quantities of conventional stabilizers, pigments, plasticizers, mould release agents, flame retardants and/or antistatic agents are mixed together in known manner and melt compounded or melt extruded in conventional apparatus at temperatures of from 200° C. to 330° C.

The various components may be mixed together in known manner either successively or simultaneously, either at temperatures of about 20° C. (room temperature) or at elevated temperatures.

The moulding compounds according to the present invention may be used for the preparation of all types of moulded bodies. In particular, they may be used for the production of injection moulded articles. Examples of moulded products which can be produced from these compounds include housing parts of all kinds, for example for domestic appliances such as juice extractors, coffee machines and mixers, covering plates for the building industry and parts used in the building industry and the motor vehicle construction industry. The moulding compounds are also suitable for products used in electrotechnology, such as contact strips, on account of their excellent electrical properties.

The moulding compounds may also be used for the production of moulded bodies by deep drawing previously produced plates or films.

The term "particle size" is used in this context to denote the average particle diameter $d_{50}$ determined by ultracentrifuge measurements according to W. Scholtan et al, Kolloid-Z. and Z. polymere 250 (1972), 782–796.

EXAMPLES (1) Polycondensates and polymers used

A. Straight chained polycarbonate based on bisphenol A having a relative solution viscosity $n_{rel}$ of from 1.26 to 1.28 determined in $CH_2Cl_2$ at 25° C. and a concentration of 0.5 g/100 ml.

B. Graft polymers - graft stocks

B.1.1 Polybutadiene latex prepared by aqueous emulsion polymerisation and having a solids content of 44.3% by weight, an average particle diameter ($d_{50}$-value) of 0.4 μm and a gel content of 86.5% by weight.

B.1.2 Polybutadiene latex prepared by aqueous emulsion polymerisation and having a solids content of 40.5%, an average particle diameter ($d_{50}$-value) of 0.1 μm and a gel content of 86.2% by weight.

Preparation of graft polymers B

Latices of the graft stock are introduced into a reactor in quantities corresponding to 750 parts by weight of rubber. The latices are then diluted with water to adjust the polymer solids content to 23.6% by weight. Polymerisation is started at a temperature of 64° to 66° C. by the addition of a solution of 7.5 parts by weight of potassium peroxidisulphate in 195 parts by weight of water.

The following quantities are then run into the reactor at a uniform rate over a period of 4 hours at 64° to 66° C. with stirring:

(1)

750 parts by weight of monomer mixture having the composition shown in Table 1

(2)

375 parts by weight of water,
15 parts by weight of the sodium salt of disproportionated abietic acid and
11.5 parts by weight of 1N sodium hydroxide solution.

After-polymerisation is carried out at 65° C. after all the components have been added. After stabilization of the latex with 1.6% by weight of phenolic antioxidant, the product is worked up by coagulation with a mixture of acetic acid and MgSO₄ at a temperature of from 70 to 98° C. After the graft polymers have been washed and purified, they are worked up into dry powders.

(1) Comparison Examples

C. Styrene/acrylonitrile copolymer with a styrene:acrylonitrile ratio of 72:28 and a limiting viscosity number of $[\eta]=0.55$ dl/g (determined in dimethylformamide at 20° C.).

(2) Preparation and examination of the moulding compounds

Components A., B. and optionally C. were compounded on a 3-1-internal kneader at temperatures of from 200° to 220° C.

The moulded bodies were produced in an injection moulding machine at 260° C. unless otherwise stated. The notched impact strength was determined by the method of Izod on rods measuring 2.5×0.5×0.125" according to ASTM-D-256 at room temperature, −20° C. and −40° C.

The coalescence seam strength was determined from the impact strength according to DIN 53 452 (Charpy method) at the connecting seam of test samples measuring 170×10×4 mm which have been extruded from two sides.

As shown in the Table, moulding compounds which have a greater coalescence seam strength and greater low temperature strength than those known in the art are only obtained with the graft polymers according to the invention.

TABLE 1

| | Graft polymers used in the moulding compounds | | | | |
|---|---|---|---|---|---|
| | Graft stock 50 parts by weight | Composition of graft monomers 50 parts by weight | | | |
| No. | Type | S | ACN | n-BA | t-BA |
| I(1) | B.1.1 | 36.0 | 14.0 | — | — |
| II | B.1.1 | 32.4 | 12.6 | 5 | — |
| III | B.1.1 | 31.7 | 12.3 | 5 | 1 |
| IV | B.1.1 | 35.3 | 13.7 | — | 1 |
| V(1) | B.1.2 | 36.0 | 14.0 | — | — |
| VI | B.1.2 | 32.4 | 12.6 | 5 | — |
| VII | B.1.2 | 31.7 | 12.3 | 5 | 1 |
| VIII | B.1.2 | 35.3 | 13.7 | — | 1 |

S Styrene
ACN Acrylonitrile
n-BA n-butylacrylate
t-BA t-butylacrylate

TABLE 2

| | Composition and properties of the moulding compounds | | | | | | | |
|---|---|---|---|---|---|---|---|---|
| | Components | | | | | | | |
| | A | Graft polymer B | | C | Notched impact strength according to Izod J/m | | | Coalescence seam strength |
| Example | % by weight | Serial No. (Table 1) | % by weight | % by weight | RT | −20° C. | −40° C. | kJ/m² |
| 1(1) | 60 | I | 24 | 16 | 584 | 490 | 398 | 4.0 |
| 2 | 60 | II | 24 | 16 | 738 | 612 | 544 | 4.6 |
| 3 | 60 | III | 24 | 16 | 762 | 617 | 534 | 13.1 |
| 4 | 60 | IV | 24 | 16 | 757 | 609 | 543 | 5.6 |
| 5(1) | 60 | V | 24 | 16 | 395 | 138 | 104 | 3.4 |
| 6 | 60 | VI | 24 | 16 | 596 | 493 | 265 | 4.4 |
| 7 | 60 | VII | 24 | 16 | 684 | 587 | 507 | 17.4 |
| 8 | 60 | VIII | 24 | 16 | 675 | 562 | 510 | 17.9 |

(1)Comparison Examples

We claim:

1. Thermoplastic molding compounds containing
A. 5 to 98 parts by weight of one or more thermoplastic polycarbonates based on diphenols of the formula (II) and (IIa)

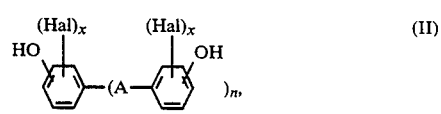

-continued

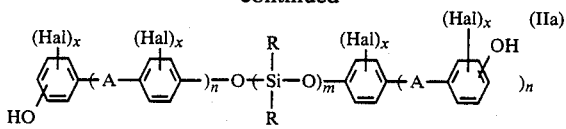

wherein
A is a single bond, alkylene having 1 to 5 carbon atoms, alkylidene having 2 to 5 carbon atoms, cycloalklidene, S or SO$_2$,
Hal is chloro or bromo,
X is 0, 1 or 2
m is an integer from 5 to 100,
n is 0 or 1, and
each R is identical or different straight-chain alkyl having 1 to 20 carbon atoms, branched alkyl having 3 to 20 alkyl carbon atoms or aryl having 6 to 20 carbon atoms,
B. from 2 to 70 parts by weight of one or more graft polymers of
B.1 from 10 to 95 parts by weight of a cross-linked, particulate diene rubber or alkyl acrylate rubber graft stock having an average particle diameter (d$_{50}$-value) of from 0.05 tp 5 μm and a glass transition temperature ≦10° C. and
B.2 from 90 to 5 parts by weight of a graft scion of vinyl monomer polymer, the graft scion having been obtained by graft polymerization of a monomer mixture of
B.2.1 from 50 to 95 parts by weight of styrene, α-methylstyrene, nuclear-substituted styrene, methyl methacrylate or mixtures thereof and
B.2.2 from 50 to 5 parts by weight of (meth) acrylonitrile, methyl methacrylate, maleic acid anhydride, N-substituted maleimide or mixtures thereof and, based on 100 parts by weight of the sum of B.2.1 and B.2.2,
B.2.3 from 0 to 40 parts by weight of a primary or secondary aliphatic acrylic acid ester having from 2 to 10 carbon atoms in the alcohol moiety of the molecule, and
B.2.4 from 0 to 10 parts by weight of a tert-butyl ester of acrylic acid or methacrylic acid, in the presence of the graft stock B.1, and
C. from 0 to 80 parts by weight of a thermoplastic copolymer of
C.1 from 50 to 95 parts by weight of styrene, α-methylstyrene, nuclear-substituted styrene, methyl methacrylate or mixtures thereof and
C.2 from 50 to 5 parts by weight of (meth)acrylonitrile, methyl methacrylate, maleic acid anhydride, N-substituted maleimide or mixtures thereof, the sum of parts by weight of A.+B. and optionally C. being in all cases 100 parts by weight, characterized in that B.2 contains at least one of the components B.2.3 or B.2.4.

2. Moulding compounds according to claim 1, characterised in that component A. is a copolycarbonate of diphenols (II) and (IIa), the proportion by weight of diphenols (IIa) in the copolycarbonate being from 1 to 20% by weight, based on the sum of the weights of diphenols of formula (II) and (IIa) used.

3. Moulding compounds according to claim 1, characterised in that component A. is a mixture of several thermoplastic polycarbonates and, in the case of mixtures with polydiorganosiloxane polycarbonate block copolycarbonates, the proportion by weight of diphenols (IIa), based on the total sum of diphenols in the polycarbonate mixture, is from 1 to 20% by weight.

4. Moulding compounds according to claim 1, characterised in that component A. is used in quantities of from 20 to 95 parts by weight.

5. Moulding compounds according to claim 1, characterised in that component B. is used in quantities of from 5 to 60 parts by weight.

6. Moulding compounds according to claim 1, characterised in that component C. is used in quantities of from 0 to 70 parts by weight.

7. Moulding compounds according to claim 1, characterised in that component C. is used in quantities of from 5 to 50 parts by weight.

8. Moulding compounds according to claim 1, characterised in that the graft stock B.1 is used in quantities of from 20 to 70 parts by weight and the graft scion B.2 consists of from 80 to 30 parts by weight of vinyl polymer B.2.1 to B.2.4.

9. Moulding compounds according to claim 1, characterised in that the graft stock B.1 consists of cross-linked elastomer particles having an average particle diameter of from 0.075 to 1 μm and a glass transition temperature ≦−20° C.

10. Moulding compounds according to claim 1, characterised in that the graft scion B.2 contains from 2 to 30 parts by weight of B.2.3 and from 0.2 to 8 parts by weight of B.2.4, based on 100 parts by weight of B.2.1 and B.2.2.

11. Moulding compounds according to claim 1, characterised in that the graft stock B.2 contains from 3 to 20 parts by weight of B.2.3 and from 0.3 to 4 parts by weight of B.2.4, based on 100 parts by weight of B.2.1 and B.2.2.

12. Moulding compounds according to claim 1, characterised in that they contain, in addition, at least one additive selected from stabilizers, pigments, plasticizers, mould release agents, flame retardants and antistatic agents.

* * * * *